(12) United States Patent
Lefebvre et al.

(10) Patent No.: US 12,012,972 B2
(45) Date of Patent: Jun. 18, 2024

(54) DIFFUSER AND ASSOCIATED COMPRESSOR SECTION OF AIRCRAFT ENGINE

(71) Applicant: PRATT & WHITNEY CANADA CORP., Longueuil (CA)

(72) Inventors: Guy Lefebvre, St-Bruno-de-Montarville (CA); Christopher Gover, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/872,242

(22) Filed: Jul. 25, 2022

(65) Prior Publication Data

US 2024/0026900 A1    Jan. 25, 2024

(51) Int. Cl.
| | | |
|---|---|---|
| F04D 29/44 | (2006.01) |
| F02C 6/08 | (2006.01) |
| F04D 17/10 | (2006.01) |
| F04D 29/28 | (2006.01) |
| F04D 29/68 | (2006.01) |

(52) U.S. Cl.
CPC .............. *F04D 29/444* (2013.01); *F02C 6/08* (2013.01); *F04D 17/10* (2013.01); *F04D 29/284* (2013.01); *F04D 29/682* (2013.01)

(58) Field of Classification Search
CPC .... F04D 29/444; F04D 27/023; F04D 29/284; F04D 29/441; F02C 6/08; F02C 3/08
See application file for complete search history.

(56) References Cited

U.S. PATENT DOCUMENTS

| | | | | |
|---|---|---|---|---|
| 2,435,836 A | * | 2/1948 | Johnson | F02C 3/08 |
| | | | | 415/208.4 |
| 3,088,279 A | | 5/1963 | Gunther | |
| 3,166,237 A | * | 1/1965 | Hill | F02C 7/18 |
| | | | | 417/409 |
| 4,368,005 A | | 1/1983 | Exley et al. | |
| 5,555,721 A | * | 9/1996 | Bourneuf | F02C 7/18 |
| | | | | 415/115 |
| 6,155,777 A | | 12/2000 | Aschenbruck et al. | |
| 7,841,187 B2 | | 11/2010 | Behaghel et al. | |

(Continued)

FOREIGN PATENT DOCUMENTS

WO      2002006676      1/2002

*Primary Examiner* — Justin D Seabe
(74) *Attorney, Agent, or Firm* — Norton Rose Fulbright Canada LLP

(57) ABSTRACT

The compressor section can have a centrifugal impeller operable to rotate around an axis, the centrifugal impeller having blades, a compressor inlet oriented towards the front and axially relative the axis, a compressor outlet oriented radially outwardly relative the axis, a diffuser having a diffusion flow path, a diffuser inlet in fluid flow communication with the compressor outlet, a diffusion flow path between a rear wall and a front wall; a collector extending circumferentially around the axis, having a collector inlet in fluid communication with the diffuser outlet, and a collector outlet; and hollow structural members protruding rearwardly from the rear wall, the hollow structural members being circumferentially interspaced from one another, each hollow structural member having a length extending radially along the rear wall and having an internal conduit extending radially inwardly along the length.

20 Claims, 4 Drawing Sheets

(56) References Cited

U.S. PATENT DOCUMENTS

| | | | |
|---|---|---|---|
| 7,937,951 B2* | 5/2011 | Brunet | F01D 5/046 |
| | | | 60/726 |
| 8,147,178 B2* | 4/2012 | Ottaviano | F02C 3/08 |
| | | | 415/104 |
| 9,228,497 B2* | 1/2016 | Ottow | F02C 3/04 |
| 9,683,488 B2 | 6/2017 | Ress, Jr. et al. | |
| 10,753,370 B2* | 8/2020 | Hall | F04D 29/462 |
| 2008/0118341 A1 | 5/2008 | Joco et al. | |
| 2008/0141678 A1 | 6/2008 | Brunet et al. | |

* cited by examiner

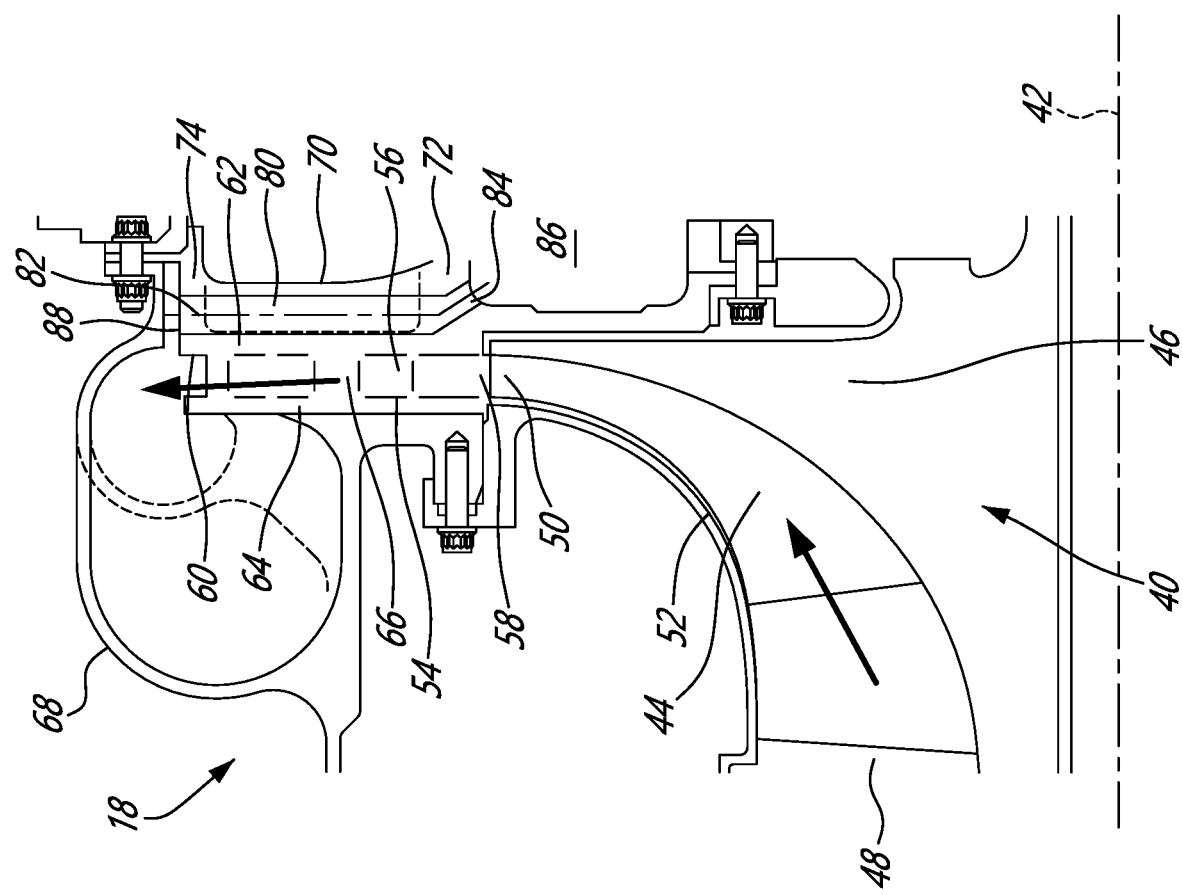

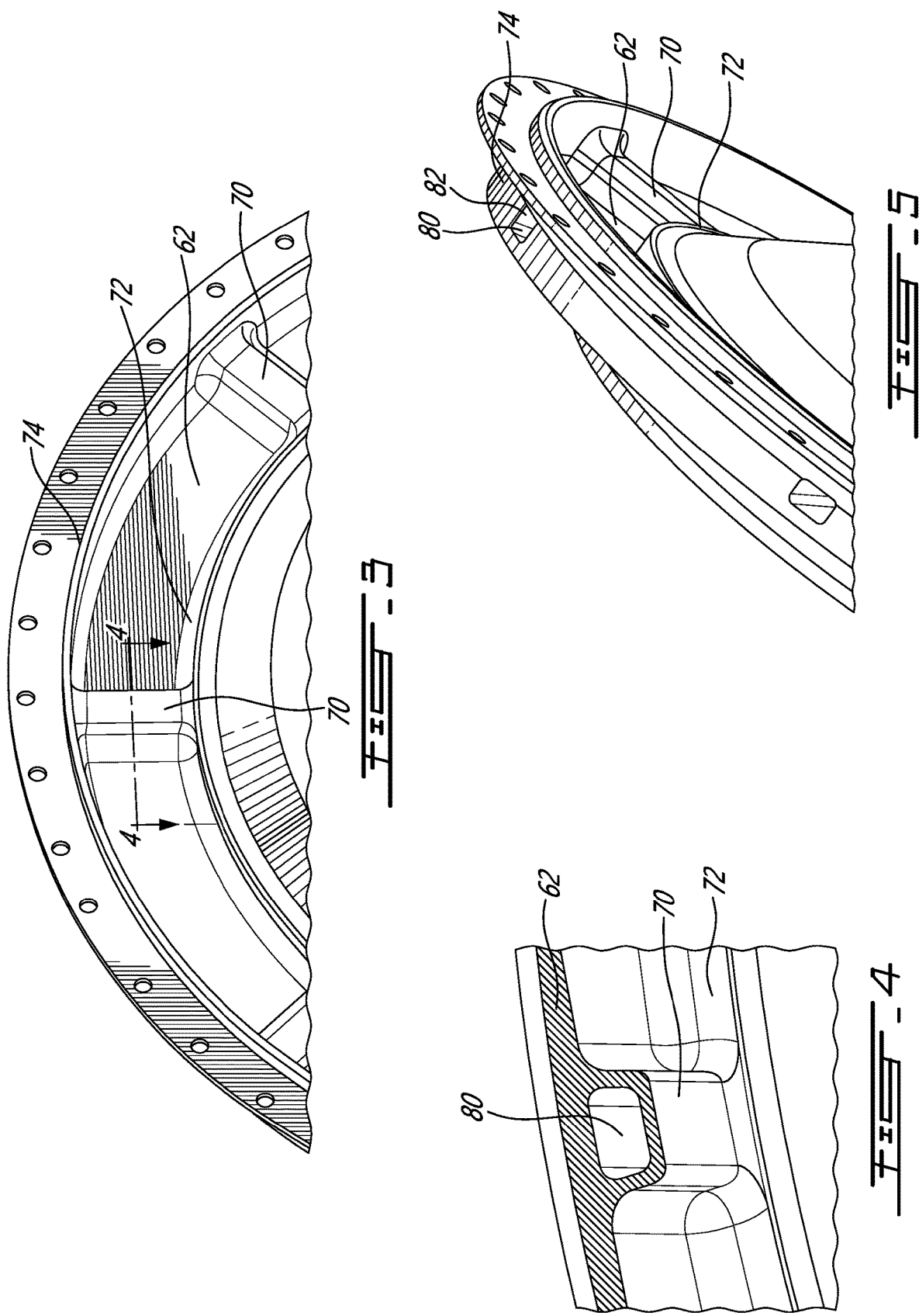

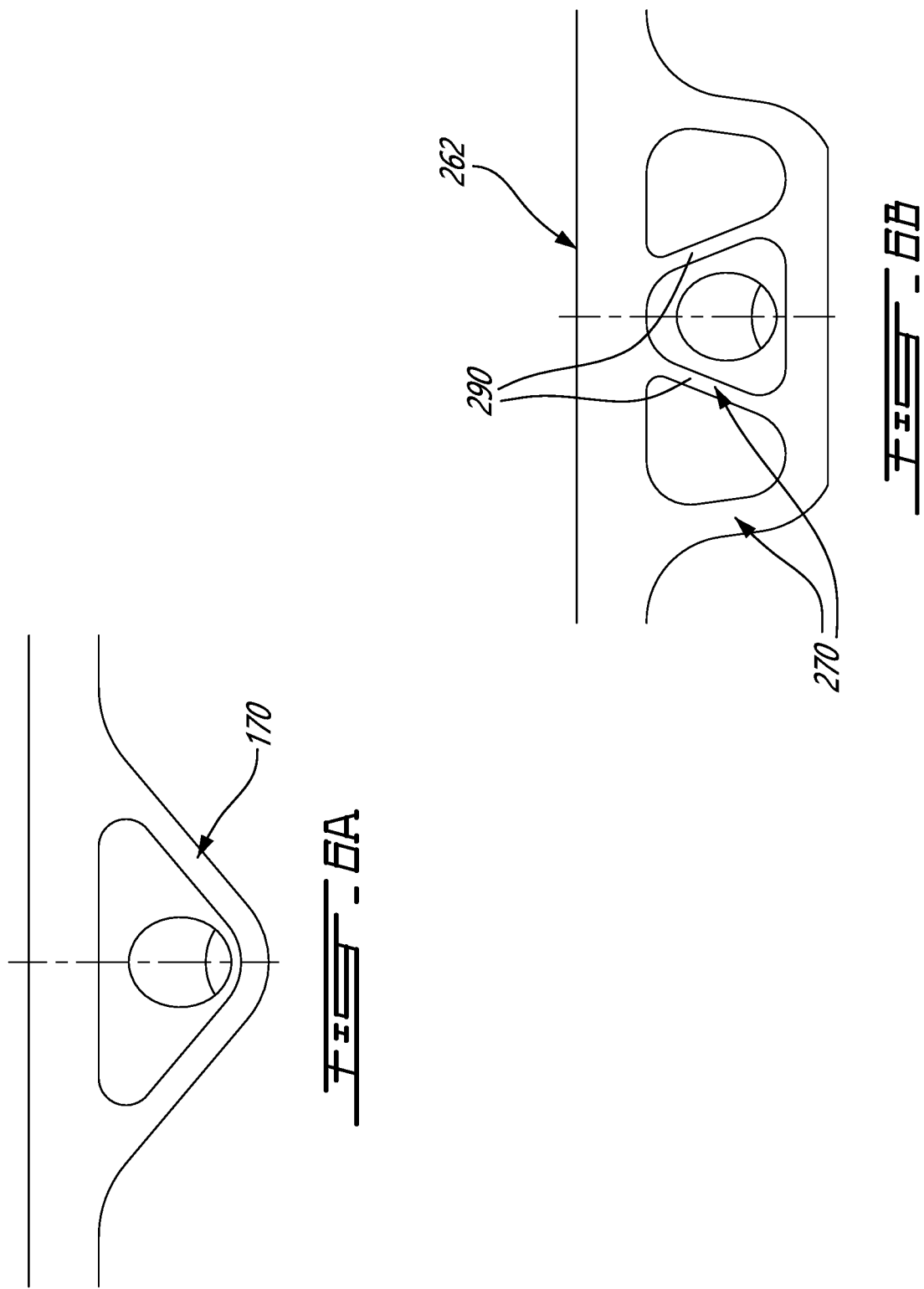

DIFFUSER AND ASSOCIATED COMPRESSOR SECTION OF AIRCRAFT ENGINE

TECHNICAL FIELD

The application relates generally to aircraft engines and, more particularly, to compressor sections thereof.

BACKGROUND OF THE ART

In aircraft engines, centrifugal compressor stages typically have in fluid flow sequence an intake, a centrifugal impeller extending axially from the intake to a centrifugal impeller outlet, a diffuser extending radially outwardly from the centrifugal impeller outlet, and a collector receiving the air from the outlet of the diffuser and guiding it to an outlet. The role of the diffuser is to gradually slow the gas velocity to convert a portion of the flow's high kinetic energy at the outlet of the impeller into static pressure at the collector.

The design of aircraft engine components is typically very complex in nature, since many different, and often competing, factors are to be taken into consideration. Indeed, while durability and reliability of components typically receives a very significant degree of attention, many other considerations cannot be ignored, such as manufacturing constraints, production costs, maintenance, and weight. Weight has always been a significant consideration in aircraft engines since it is directly related to fuel efficiency during flight, and can directly affect aircraft range and capacity for instance. Weight is receiving an ever-increasing degree of attention in a context of increasing environmental awareness. While existing centrifugal compressor stages have been satisfactory to a certain degree, there remained room for improvement.

SUMMARY

In one aspect, there is provided a compressor section comprising: a centrifugal impeller operable to rotate around an axis extending between a front and a rear, the centrifugal impeller having blades extending between a compressor inlet and a compressor outlet, the compressor inlet oriented towards the front and axially relative the axis, the compressor outlet oriented radially outwardly relative the axis; a diffuser having a diffusion flow path extending radially between a diffuser inlet and a diffuser outlet, the diffuser inlet in fluid flow communication with the compressor outlet, the diffusion flow path between a rear wall and a front wall; a collector extending circumferentially around the axis, having a collector inlet in fluid communication with the diffuser outlet, and a collector outlet; and hollow structural members protruding rearwardly from the rear wall, the hollow structural members being circumferentially interspaced from one another, each hollow structural member having a length extending radially along the rear wall and having an internal conduit extending radially inwardly along the length, between a conduit inlet in fluid communication with the diffuser outlet and a conduit outlet located radially inwardly from the conduit inlet.

In another aspect, there is provided an aircraft engine comprising in sequential flow communication an intake, a compressor section, and a combustor, the compressor section comprising: a centrifugal impeller operable to rotate around an axis extending between a front and a rear, the centrifugal impeller having blades extending between a compressor inlet and a compressor outlet, the compressor inlet oriented towards the front and axially relative the axis, the compressor outlet oriented radially outwardly relative the axis; a diffuser having a diffusion flow path extending radially between a diffuser inlet and a diffuser outlet, the diffuser inlet in fluid flow communication with the compressor outlet, the diffusion flow path between a rear wall and a front wall; a collector extending circumferentially around the axis, in fluid communication with the diffuser outlet, and having a collector outlet; and structural members protruding rearwardly from the rear wall, the structural members being circumferentially interspaced from one another, each structural member having a length extending radially along the rear wall.

In another aspect, there is provided a diffuser for a compressor section, the diffuser comprising a diffusion flow path defined circumferentially around an axis and extending radially between a diffuser inlet and a diffuser outlet, the diffuser inlet in fluid flow communication with the compressor outlet, the diffusion flow path between a rear wall and a front wall, and hollow structural members protruding rearwardly from the rear wall, the hollow structural members being circumferentially interspaced from one another, each hollow structural member having a length extending radially along the rear wall and having an internal conduit extending radially inwardly along the length, between a conduit inlet in fluid communication with the diffuser outlet and a conduit outlet located radially inwardly from the conduit inlet.

DESCRIPTION OF THE DRAWINGS

Reference is now made to the accompanying figures in which:

FIG. 2 is a cross-sectional view of a compressor section in accordance with an embodiment;

FIG. 3 is an oblique view of a rear wall of a diffuser, in accordance with an embodiment;

FIG. 4 is a cross-sectional view taken along lines 4-4 of FIG. 3;

FIG. 5 is another oblique view of the diffuser of FIG. 3;

FIGS. 6A and 6B are cross-sectional views illustrating potential variants to the cross-sectional view of FIG. 4.

DETAILED DESCRIPTION

Figure 1:
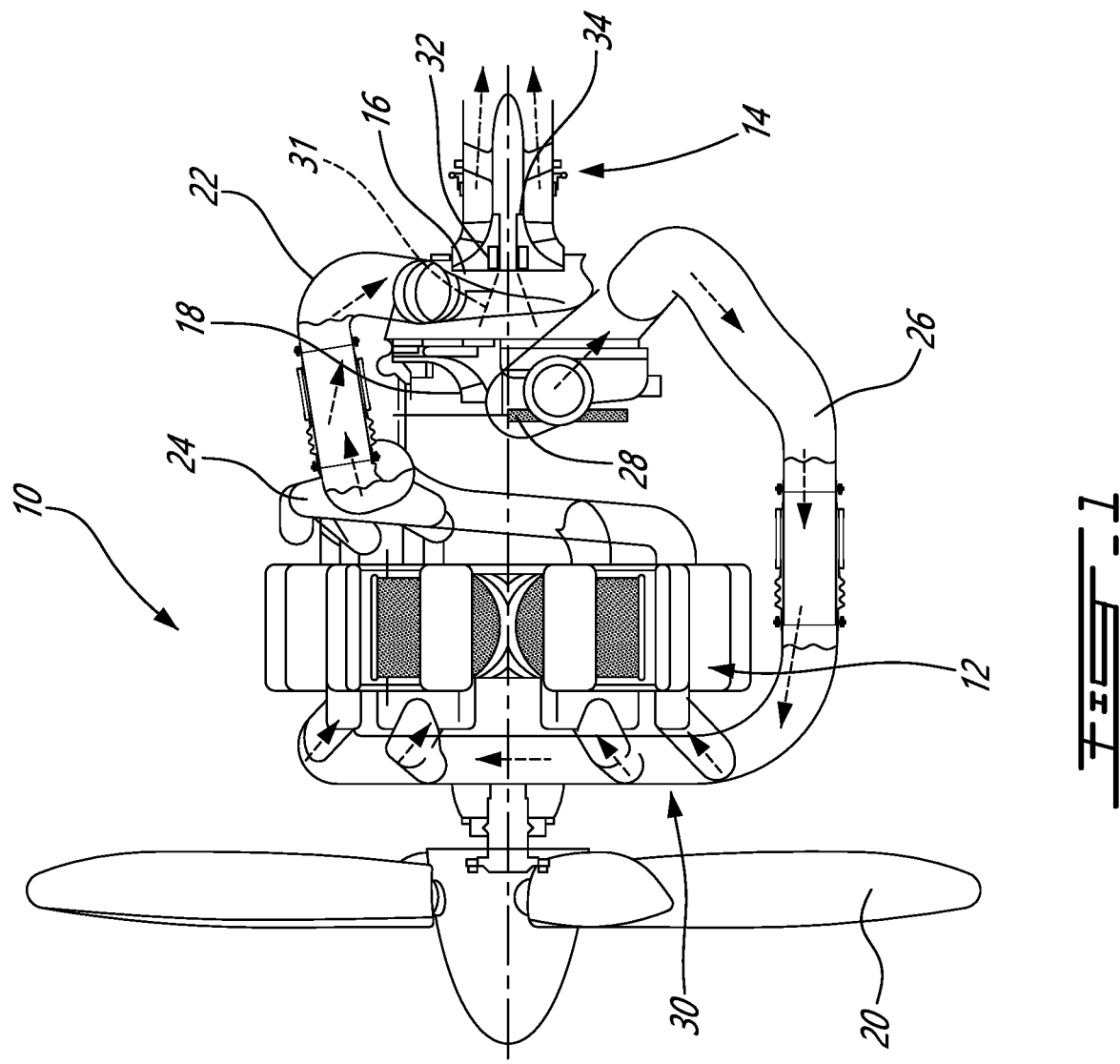
FIG. 1 is a schematic cross-sectional view of a gas turbine engine.

FIG. 1 illustrates an aircraft engine 10 of a type preferably provided for use in subsonic flight, generally comprising, in sequential flow communication, an intake, a compressor section 18, a combustion engine 12 in which compressed air is mixed with fuel and ignited delivering power and exhaust gasses, and a gas turbine 14. In the illustrated embodiment, the combustion engine 12 can have one or more combustion engine units such as piston engine units, and/or Wankel engine units for instance.

In this embodiment, a compressor section 18 is also provided. The compressor section 18 can be a centrifugal compressor for instance, and be used to boost the pressure of air from the environment in order to feed higher pressure air to the intake of the combustion engine 12. More specifically, compressed air can be collected from the compressor section 18 by a compressed air pipe, such as via a suitable collector 28 (e.g. a helical scroll) for instance, and fed to the combustion engine 12, optionally via an intake manifold 30. The compressor section 18 can be powered by the gas turbine 14, by the combustion engine 12, and/or by an auxiliary electric engine, to name some examples.

Most of the compressed gas from the compressor section 18 can be conveyed to a combustor, such as combustion engine units, or the like where its temperature and pressure can be further increased by the energy of combusting fuel, but a portion of the compressed gas may be bled along an auxiliary pressurized gas passage 31 and used for other uses, such as supplying pressure to a bearing seal 32 or limiting exhaust gas ingestion across a gap 34 between stator and rotor elements of a gas turbine 14 for instance.

In the illustrated embodiment, the exhaust gasses are collected from the combustion engine 12 and directed to a gas turbine 14. The gas turbine 14 can convert energy in the form of heat, pressure and/or velocity of the exhaust gasses into angular velocity of a rotor 15, and the rotor 15 can be used to direct power to one or more other device, such as a compressor section 18, a propulsor 20 (e.g. propeller, fan), and/or an electric machine acting as a generator. The transfer of power can be direct, or via a clutch and/or a gearbox.

The exhaust gasses can be collected from one or more exhaust gas outlet of the combustion engine 12 via an exhaust conduit 22 such as an exhaust pipe, optionally via an exhaust manifold 24 which connects an exhaust pipe to individual engine units. The exhaust conduit 22 can be straight, continuously curved, or made of straight sections interconnected via one or more elbows, to name some examples. The exhaust conduit 22 can provide a linear flow of exhaust gasses, whereas the gas turbine 14 can be configured for receiving an annular stream of exhaust gasses. A gas turbine intake 16 can be provided for connecting the exhaust conduit 22 to the gas turbine 14. The gas turbine intake 26 can be configured for receiving the linear flow of exhaust gasses from the exhaust conduit 22, distributing it circumferentially, re-orienting its velocity from a circumferential to an axial orientation, and feeding it as an axially-oriented annular stream to the gas turbine 14. The turbine is optional.

It will be noted that the embodiment presented in FIG. 1 is provided solely to present one possible example embodiment. Other embodiments than the embodiment illustrated in FIG. 1 can integrate a centrifugal compressor stage, as known in the art, such as turbofan engines, turboprop engines and turboshaft engines, to name some additional examples.

An example compressor section is presented in FIG. 2. In this example, the compressor section 18 has a centrifugal impeller 40 integrated to a rotor 15. The rotor 15 can be rotatably mounted within non-rotary portions of an aircraft engine 10 via bearings 32, for rotation around an axis 42. For the purpose of providing relative references, the axis 42 will be said to extend between a front and a rear, and can be used as a reference to define axial (along the axis), radial (transversally away or towards the axis), and circumferential (around the axis) orientations.

The centrifugal impeller 40 has a plurality of blades 44 rooted to a hub 46. The blades 44 extend along a compressor flow path which extends between a compressor inlet 48 and a compressor outlet 50. The blades 44 are circumferentially interspaced from one another. The blades 44 not only curve from axial to radial but typically also twist circumferentially around the axis 42 to a certain degree, as known in the art. The hub 46 extends from an axially oriented tip to a radially oriented tip. The portion of the hub 46 leading to the radially oriented tip is sometimes referred to as a back plate, with reference to the rear direction introduced above. The compressor flow path extends between a curved face of the hub 46 and a shroud 52, and tapers between the compressor inlet 48 and the compressor outlet 50. The compressor flow path can be said to be formed of a plurality of circumferentially interspaced segments each defined between a corresponding pair of blades 44.

The compressor section 18 further has a diffuser 54. The diffuser 54 has a diffusion flow path 56 extending radially between a diffuser inlet 58 and a diffuser outlet 60. The diffuser inlet 58 is in fluid flow communication with the compressor outlet 50. The diffusion flow path 56 is positioned, in the axial orientation, between a rear wall 62 and a front wall 64. The diffuser 54 can have a plurality of diffuser vanes 66 operable to more efficiently convert kinetic energy of the gasses at the compressor outlet 50 into pressure at the collector 68 than if vanes 66 were not used. The diffuser vanes 66 can be circumferentially interspaced from one another relative the axis and each bridge, in the axial orientation, the front wall 64 to the rear wall 62, and the vanes 66 can be wedged, as known in the art. The diffusion flow path 56 can be said to be formed of a plurality of diffusion flow passages with each diffusion flow passage extending circumferentially between a corresponding pair of vanes 66. In an embodiment, the front wall 64, the rear wall 62, and the vanes 66 can all be integral to one another and form part of a component which can be referred to as a diffuser core, and is provided as a monolithic component in this embodiment, though it will be understood that this is optional and other configurations are possible.

The compressor section 18 further has a collector 68. The collector 68 extends circumferentially around the axis 42, and can be said to define a circumferential flow path in this example. The collector 68 has an internal volume in fluid communication with the diffuser outlet 60 at a collector inlet, and a collector outlet (not shown). The collector 68 can be in the form of a plenum or of a volute or scroll, for instance. In the case of a scroll, the cross-sectional area of the internal volume of the collector 68, taken in a plane extending both axially and radially (e.g. such as shown in FIG. 2, later referred to as a radial-axial cross-sectional area), can progressively increase along the circumferential orientation and terminate at a tangential outlet, as known in the art.

The pressure can be relatively high in the diffusion flow path 56, and this pressure can exert mechanical stress at the rear wall 62. One way to address structural resistance to the pressure is to thicken the rear wall 62, but it will be understood that this can lead to a significant weight penalty. In the illustrated embodiment, another strategy is used at the rear wall 62 to address the structural resistance to the pressure in the diffusion flow path 56.

As perhaps best seen in FIG. 3, the compressor section 18 can be provided with a plurality of hollow structural members 70 protruding rearwardly from the rear wall 62 of the diffuser 54. The hollow structural members 70 can have a length extending radially along the rear wall 62, and can be circumferentially interspaced from one another. The hollow structural members 70 can provide additional structural resistance to the structure of the rear wall 62 at a lower weight penalty compared to the approach of thickening the entirety of the wall evoked above. In this embodiment, the hollow structural members 70 extend radially between an inner structural ring 72 and an outer structural ring 74, both also protruding rearwardly from the rear wall 62. A plurality of pockets are thus formed between corresponding pairs of hollow structural members 70, between the inner structural ring 72 and the outer structural ring 74, the pockets leading to corresponding web portions of the rear wall 62. It will be understood that in alternate embodiments, either one, or both, of the inner structural ring 72 and of the outer structural ring 74 can be omitted.

As shown in FIG. 4, the hollow structural members 70 can each form, with the rear wall 62, a corresponding hollow structural section. In the embodiment illustrated in FIG. 4, the hollow structural section has a rectangular cross-section with rounded internal and external corners, but it will be understood that other cross-sectional shapes are possible in alternate embodiments, such as triangular cross-sections and circular or semi-circular cross-sections for instance, the details of which can be left to the designer in view of a specific embodiment. More specifically, in this embodiment, the hollow structural member 70 can generally have a C shape having two legs leading to forward-facing ends and a closed rear, the two forward-facing ends meeting and merging into the rear wall, leaving an internal cavity between the two legs, and between the rear wall and the closed rear.

Referring back to FIG. 3, in the illustrated embodiment, the hollow structural members 70 are harnessed as fluid passages in addition to being harnessed for structural resistance. More specifically, the internal cavity is used as an internal conduit 80 extending radially inwardly along the length of the hollow structural member 70. More specifically, the internal conduit 80 extends between a conduit inlet 82 and a conduit outlet 84. The conduit inlet 82 can be in fluid flow communication with the diffuser outlet 60. The conduit outlet 84 can be located radially inwardly relative the conduit inlet 82. The conduit outlet 84 can be in fluid flow communication with a cavity 86 or plenum formed in casing of the engine, for instance, and which can act as another portion of a pressurized gas passage. The internal conduits 80 can form portions of the pressurized gas passage. The pressurized gas passage can lead to bearing seals, such as to pressurize bearing cavities, and/or to gaps between turbine rotor and stator elements, such as to prevent exhaust gas ingestion, and/or to any other area of the engine where pressurized gas can be useful. In the illustrated embodiment, the rear wall 62 extends radially inwardly behind a portion of the centrifugal impeller 40, and the conduit outlet 84 is at the end of an aperture which leads obliquely into a cavity 86, at an intermediary location along the radial length of the rear wall 62. In other embodiments, the conduit outlet 84 can lead farther along the radially inward direction, or the radially inward extension of the rear wall 62 behind the centrifugal impeller 40 can be absent, to name some other examples.

Referring now to FIGS. 2 and 5, it will be noted that in this example, the conduit inlets 82 are provided in the form of radially-outer open ends of the hollow structural members 70, and these radially-outer open ends are open to a gap 88 which is in fluid communication with the internal volume of the collector 68, and are thus in fluid flow communication with the diffuser outlet 60 via the collector 68 and the gap 88. The radially-outer open ends 82 are provided across the radially outer structural ring 74. Many other embodiments are possible.

FIGS. 6A and 6B present two alternate examples of cross-sectional shapes for the hollow structural members 170, 270. In the example presented in FIG. 6A, the hollow structural member 170 has a generally triangular cross-sectional shape. In the example presented in FIG. 6B, the hollow structural member 270 still has a generally triangular cross-sectional shape, but two internal webs 290 are provided which extend along the length of the hollow structural members 270, and axially (partially obliquely) between the rear wall 262 and the closed rear of the hollow structural member 270. The internal webs 290 can delimit three internal cavities, and in this embodiment, only a central one of the three internal cavities may be used as a conduit, for instance.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, orientations, such as "axial", "radial", "circumferential" are provided here in a manner to provide a general indication of how components are configured in three-dimensional space and are not to be interpreted strictly. For instance, "extending radially" means extending, at least to some extent, in the radial orientation. "Extending mainly radially" means extending within 45 degrees, such as within 30 degrees or within 15 degrees, of the radial orientation. The hollow structural members can extend mainly radially in some embodiments. Moreover, the expressions front and rear are used simply to provide relative orientation references and are not to be interpreted as having any specific relation to a direction of travel of a vehicle bearing the engine. Indeed, in some engines, the intake is positioned rearwardly of the impeller relative the direction of travel, and such an intake will be considered as being positioned in front of the impeller in this specification by convention. Also, while in embodiments presented above, hollow structural members form an internal conduit, alternate embodiments are possible where hollow structural members are not used as conduits, and/or where structural members are used which are not hollow. Yet further modifications could be implemented by a person of ordinary skill in the art in view of the present disclosure, which modifications would be within the scope of the present technology.

The invention claimed is:

1. A compressor section comprising:
a centrifugal impeller operable to rotate around an axis extending between a front and a rear, the centrifugal impeller having blades extending between a compressor inlet and a compressor outlet, the compressor inlet oriented towards the front and axially relative the axis, the compressor outlet oriented radially outwardly relative the axis,
a diffuser having a diffusion flow path extending radially between a diffuser inlet and a diffuser outlet, the diffuser inlet in fluid flow communication with the compressor outlet, the diffusion flow path between a rear wall and a front wall, the diffuser having an inner structural ring and an outer structural ring disposed radially outwardly of the inner structural ring, the inner structural ring extending axially away from the centrifugal impeller and radially towards the axis;
a collector extending circumferentially around the axis, having a collector inlet in fluid communication with the diffuser outlet, and a collector outlet, the collector located radially outwardly of the diffuser outlet, the collector receiving a flow from the diffuser, the flow extending radially outwardly from the diffuser outlet; and
hollow structural members protruding rearwardly from the rear wall, the hollow structural members providing additional structural resistance to the rear wall against pressure generated in the diffuser flow path, the hollow structural members being circumferentially interspaced from one another, each hollow structural member having a length extending radially along the rear wall and having an internal conduit extending radially inwardly along the length, between a conduit inlet in fluid communication with the collector outlet to receive the flow from the diffuser outlet via the collector, and a conduit outlet located radially inwardly from the conduit inlet, the internal conduit disposed alongside the diffuser flow path and separated from the diffuser flow path by the rear wall, the conduit outlet located radially inwardly of the inner structural ring, the conduit outlet in fluid communication with a plenum defined radially inwardly of the inner structural ring.

2. The compressor section of claim 1 wherein the hollow structural members extend radially between the inner structural ring and the outer structural ring, the inner structural ring and the outer structural ring being concentric to the axis, pockets being delimited between corresponding pairs of the hollow structural members, between the inner structural ring and the outer structural ring, each pocket leading to a corresponding web portion of the rear wall.

3. The compressor section of claim 1 wherein the hollow structural members each form, with the rear wall, a corresponding hollow structural section.

4. The compressor section of claim 3 wherein the hollow structural section has a rectangular cross-section with rounded corners.

5. The compressor section of claim 3 wherein the conduit inlets are formed of corresponding open ends of the hollow structural sections.

6. The compressor section of claim 1 wherein the rear wall, the front wall, and the hollow structural members all form part of a diffuser core, the diffuser core being a monolithic component.

7. The compressor section of claim 6 wherein the conduit outlets are formed of corresponding apertures, the apertures defined across a portion of the diffuser core.

8. The compressor section of claim 6 wherein the diffuser core has vanes, the vanes circumferentially interspaced from one another relative the axis and each extending axially between the front wall and the rear wall, the diffusion flow path including diffusion flow passages each extending between a corresponding pair of said vanes.

9. The compressor section of claim 1 wherein the collector is a scroll, the scroll having a radial-axial cross-sectional area which progressively increases along a circumferential flow path leading to the collector outlet.

10. The compressor section of claim 1 wherein the blades are rooted to a hub, the compressor section further comprising a shroud, the shroud and the hub delimiting a compressor flow path, the compressor flow path tapering between the compressor inlet and the compressor outlet.

11. The compressor section as defined in claim 1, wherein the conduit outlet extends radially towards the plenum.

12. The compressor section as defined in claim 1, wherein the collector axially overlaps the diffuser outlet.

13. The compressor section as defined in claim 1, wherein the collector outlet is a tangential outlet.

14. An aircraft engine comprising in sequential flow communication an intake, a compressor section, and a combustor, the compressor section comprising:
 a centrifugal impeller operable to rotate around an axis extending between a front and a rear, the centrifugal impeller having blades extending between a compressor inlet and a compressor outlet, the compressor inlet oriented towards the front and axially relative the axis, the compressor outlet oriented radially outwardly relative the axis,
 a diffuser having a diffusion flow path extending radially between a diffuser inlet and a diffuser outlet, the diffuser inlet in fluid flow communication with the compressor outlet, the diffusion flow path between a rear wall and a front wall, the diffuser having an inner structural ring and an outer structural ring disposed radially outwardly of the inner structural ring, the inner structural ring extending axially away from the centrifugal impeller and radially towards the axis;
 a collector extending circumferentially around the axis, in fluid communication with the diffuser outlet, and having a collector outlet, the collector located radially outwardly of the diffuser outlet, the collector receiving a flow from the diffuser, the flow extending radially outwardly from the diffuser outlet; and
 structural members protruding rearwardly from the rear wall, the structural members being circumferentially interspaced from one another, the structural members providing additional structural resistance to the rear wall against pressure generated in the diffuser flow path, each structural member having a length extending radially along the rear wall, the structural members being hollow and each having an internal conduit extending radially inwardly along the length, between a conduit inlet in fluid communication with the collector outlet to receive the flow from diffuser outlet via the collector, and a conduit outlet located radially inwardly from the conduit inlet, the internal conduit disposed alongside the diffuser flow path and separated from the diffuser flow path by the rear wall, the conduit outlet located radially inwardly of the inner structural ring, the conduit outlet in fluid communication with a plenum defined radially inwardly of the inner structural ring.

15. The aircraft engine of claim 14 wherein the structural members extend radially between the inner structural ring and the outer structural ring, the inner structural ring and the outer structural ring being concentric to the axis, pockets being delimited between corresponding pairs of the structural members and between the inner structural ring and the outer structural ring, each pocket leading to a corresponding web portion of the rear wall.

16. The aircraft engine of claim 14 wherein the hollow structural members each form, with the rear wall, a corresponding hollow structural section.

17. The aircraft engine of claim 16 wherein the hollow structural section has a rectangular cross-section with rounded corners.

18. The aircraft engine of claim 14 wherein the collector is a scroll, the scroll having a radial-axial cross-sectional area which progressively increases along a circumferential flow path leading to the collector outlet, and wherein the blades are rooted to a hub, the aircraft engine further comprising a shroud, the shroud and the hub delimiting a compressor flow path, the compressor flow path tapering between the compressor inlet and the compressor outlet.

19. The aircraft engine of claim 14 wherein the rear wall, the front wall, and the hollow structural members all form part of a diffuser core, the diffuser core being a monolithic component.

20. The aircraft engine of claim 19 wherein the conduit outlets are formed of corresponding apertures, the apertures defined across a portion of the diffuser core.

* * * * *